United States Patent
Gupta

(10) Patent No.: US 8,494,482 B2
(45) Date of Patent: Jul. 23, 2013

(54) TELECOMMUNICATIONS SYSTEM AND METHOD FOR MONITORING THE BODY TEMPERATURE OF A USER

(75) Inventor: Shekhar Gupta, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 439 days.

(21) Appl. No.: 12/258,133

(22) Filed: Oct. 24, 2008

(65) Prior Publication Data

US 2010/0105427 A1    Apr. 29, 2010

(51) Int. Cl.
H04M 11/04    (2006.01)

(52) U.S. Cl.
USPC ............ 455/404.2; 455/404.1; 455/456.1; 455/556.1; 340/539.12; 340/539.13; 600/549

(58) Field of Classification Search
USPC ......... 455/556.1, 404.1, 404.2, 456.1–456.6; 340/539.12, 539.13; 600/549
See application file for complete search history.

(56) References Cited

U.S. PATENT DOCUMENTS

| | | | |
|---|---|---|---|
| 5,337,342 A * | 8/1994 | Kruger et al. | 379/40 |
| 5,712,911 A | 1/1998 | Her | |
| 5,917,424 A | 6/1999 | Goldman et al. | |
| 6,367,020 B1 | 4/2002 | Klein | |
| 6,418,536 B1 | 7/2002 | Park | |
| 6,560,466 B1 | 5/2003 | Storko | |
| 6,650,322 B2 | 11/2003 | Dai et al. | |
| 6,735,433 B1 | 5/2004 | Cervantes | |
| 6,821,249 B2 * | 11/2004 | Casscells et al. | 600/300 |
| 6,970,080 B1 | 11/2005 | Crouch et al. | |
| 6,987,454 B2 | 1/2006 | Narayanaswami et al. | |
| 7,010,710 B2 | 3/2006 | Piazza | |
| 7,076,268 B2 | 7/2006 | Blacklock et al. | |
| 7,248,853 B1 * | 7/2007 | Sakarya | 455/404.1 |
| 7,251,233 B2 | 7/2007 | Wood | |
| 7,342,491 B2 * | 3/2008 | Fujisawa et al. | 340/539.12 |
| 7,353,413 B2 | 4/2008 | Dunstan | |
| 7,567,659 B2 * | 7/2009 | Kumagai | 379/159 |
| 7,844,677 B1 * | 11/2010 | Asher et al. | 709/206 |
| 8,363,791 B2 * | 1/2013 | Gupta et al. | 379/38 |
| 2001/0024949 A1 * | 9/2001 | Yanagida et al. | 455/404 |
| 2001/0031633 A1 | 10/2001 | Tuomela et al. | |
| 2002/0072348 A1 * | 6/2002 | Wheeler et al. | 455/404 |
| 2003/0051179 A1 | 3/2003 | Tsirkel et al. | |
| 2003/0128114 A1 * | 7/2003 | Quigley | 340/506 |
| 2003/0179094 A1 * | 9/2003 | Abreu | 340/573.1 |
| 2004/0073827 A1 | 4/2004 | Tsirkel et al. | |
| 2005/0083195 A1 * | 4/2005 | Pham et al. | 340/539.13 |
| 2005/0181838 A1 | 8/2005 | Matsuda et al. | |
| 2005/0208925 A1 * | 9/2005 | Panasik et al. | 455/404.1 |

(Continued)

OTHER PUBLICATIONS

U.S. Appl. No. 12/258,099; Final Office Action dated Feb. 14, 2012; 18 pages.

(Continued)

Primary Examiner — Steven S. Kelley
(74) Attorney, Agent, or Firm — Swanson & Bratschun, L.L.C.

(57) ABSTRACT

A method for monitoring the body temperature of a user of a wireless telephone includes detecting the body temperature of the user using a sensor disposed in the wireless telephone. A determination is made as to whether the detected temperature is within a predetermined temperature range. In response to determining that the detected temperature is within the predetermined range, an emergency notification is generated.

11 Claims, 2 Drawing Sheets

U.S. PATENT DOCUMENTS

| | | |
|---|---|---|
| 2005/0221791 A1 | 10/2005 | Angelhag |
| 2006/0135139 A1* | 6/2006 | Cheng et al. .................. 455/418 |
| 2006/0140452 A1 | 6/2006 | Raynor et al. |
| 2007/0032218 A1* | 2/2007 | Choi ......................... 455/404.1 |
| 2007/0032225 A1 | 2/2007 | Konicek et al. |
| 2007/0180282 A1 | 8/2007 | Kim |
| 2008/0014989 A1 | 1/2008 | Sandegard et al. |
| 2008/0018480 A1* | 1/2008 | Sham ......................... 340/573.1 |
| 2008/0081646 A1* | 4/2008 | Morin et al. .................. 455/466 |
| 2008/0158000 A1 | 7/2008 | Matrazzo |
| 2008/0304630 A1* | 12/2008 | Nguyen et al. .................. 379/45 |
| 2009/0160541 A1 | 6/2009 | Liu et al. |
| 2009/0254313 A1 | 10/2009 | Armour et al. |
| 2009/0323919 A1 | 12/2009 | Toner et al. |
| 2010/0105423 A1 | 4/2010 | Gupta |
| 2010/0250985 A1 | 9/2010 | Gupta |
| 2012/0198260 A1 | 8/2012 | Gupta |

OTHER PUBLICATIONS

U.S. Appl. No. 12/258,099; Non-Final Rejection dated Jun. 24, 2011; 11 pages.

U.S. Appl. No. 12/415,067; Non-Final Rejection dated Sep. 9, 2011; 13 pages.

U.S. Appl. No. 12/415,067; Notice of Allowance dated Apr. 2, 2012; 5 pages.

U.S. Appl. No. 12/415,067; Notice of Allowance dated Jan. 9, 2012; 5 pages.

U.S. Appl. No. 12/258,099; Notice of Allowance dated Mar. 21, 2013; 21 pages.

* cited by examiner

TELECOMMUNICATIONS SYSTEM AND METHOD FOR MONITORING THE BODY TEMPERATURE OF A USER

BACKGROUND OF THE INVENTION

Sharp increases or decreases in body temperature may lead to adverse health conditions and even death. For example, an elevated body temperature may lead to heat stroke that can be fatal if not properly treated. Similarly, a sharp drop in body temperature may lead to hypothermia that can be fatal if not properly treated. In either case, prompt medical attention can be the deciding factor between life and death.

SUMMARY OF THE INVENTION

According to an illustrative embodiment, a method for monitoring the body temperature of a user of a wireless telephone comprises detecting a temperature using a sensor disposed in the wireless telephone, determining whether the detected temperature is within a predetermined temperature range; and in response to determining that the detected temperature is within the predetermined range, generating an emergency notification.

DETAILED DESCRIPTION OF THE DRAWINGS

While the systems and methods are described with reference to several illustrative embodiments described herein, it should be clear that the present invention should not be limited to such embodiments. Therefore, the description of the embodiments provided herein is illustrative of the present invention and should not limit the scope of the invention as claimed.

Figure 1:
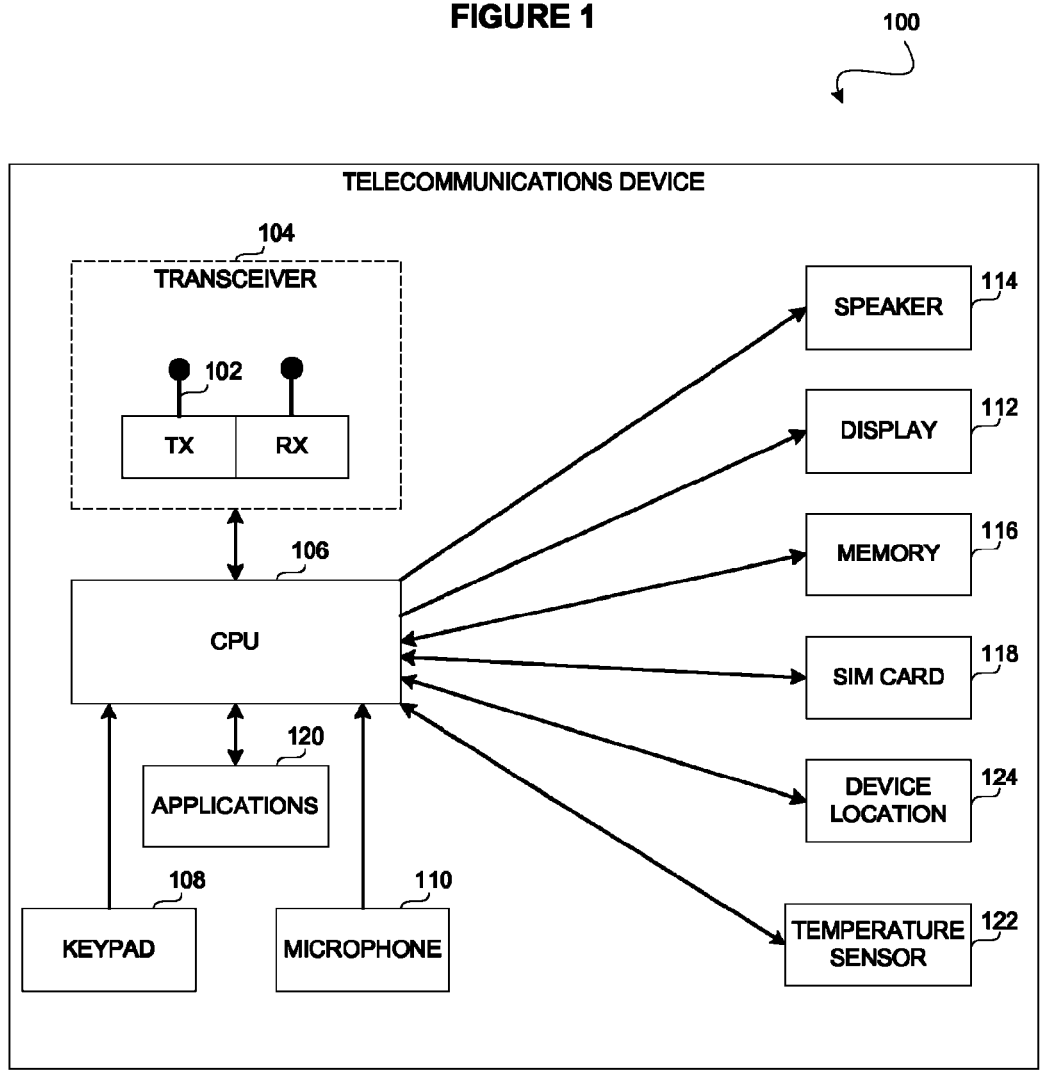
FIG. 1 is an illustration of a telecommunications device capable of monitoring the body temperature of a user.

FIG. 1 shows a block diagram of an illustrative embodiment of a telecommunications device 100. The telecommunications device 100 may be any suitable telecommunications device, including, but not limited to, standard analog telephones, cordless telephones, VoIP telephones, DECT telephones, smart telephones or wireless devices, such as cellular telephones, mobile telephones, personal digital assistants (PDA), communications enabled MP3 players, etc. The telecommunications device 100 has one or more internal or external antennas 102 for receiving and transmitting electromagnetic signals, such as radio frequency signals. A transceiver 104 is connected to the antenna(s) 102 and typically provides modulation and demodulation of the transmitted and received signals, respectively. A processor unit 106 is connected to the transceiver 104 and may comprise a signal processor, microprocessor, ASIC, or other control and processing logic circuitry. The processor unit 106 may perform signal coding, data processing, input/output processing, power control, and other functions necessary for implementing a telecommunications device. The processor unit 106 may be powered by a battery, the body heat of a user, movement by the user, or the like. A customer may provide input to the processor unit 106 via a keypad 108, a microphone 110, or a display/touchpad 112. In turn, the processor unit 106 may provide information to the customer via the display/touchpad 112 or a speaker 114.

The processor unit 106 may access information from, and store information in, a nonremovable memory 116 or a removable memory 118. The nonremovable memory 116 may consist of RAM, ROM, a hard disk, or other well-known memory storage technologies. The removable memory 118 may consist of Subscriber Identity Module (SIM) cards, which are well known in GSM communication systems, or other well-known memory storage technologies, such as "smart cards." Applications 120, including call-forwarding applications, wireless content browser applications, and address book applications, could be implemented in either the removable memory 118 or the nonremovable memory 116. While the illustrative embodiment is shown in the context of a GSM telecommunications device, it will be appreciated that the principles of the present embodiment are equally applicable to CDMA telecommunications devices and any other suitable telecommunications device or devices.

The telecommunications device 100 also includes a temperature sensor 122 configured to monitor the body heat of a user. The temperature sensor 122 may be any suitable device capable of detecting the body heat of a user, including, but not limited to, a sensor, thermocouple, resistance thermometer, thermistor, thermometer, IR thermometer, etc. As will be discussed in greater detail below, the processor unit 106 may cause an emergency notification to be generated based on whether the temperature sensor detects a body temperature of a user within a predetermined range.

The temperature sensor 122 and processor unit 106 may be configured to determine whether a user's body temperature is within one or more predetermined ranges, and, if so, generate an emergency notification. For example, if a user's body heat is detected between 103° F.-110° F., the processor unit 106 may cause an emergency notification to be generated. Also, if a user's body heat is detected between 96° F.-90° F., the processor unit 106 may cause an emergency notification to be generated. In an alternative embodiment, if a user's body heat is detected outside of the range 96° F.-100° F., the processor unit 106 may cause an emergency notification to be generated. It will be appreciated that the forgoing temperature ranges are only illustrative in nature and any suitable temperature range(s) may be employed. The predetermined range(s) may be programmed by the manufacturer, medical personnel, the user or any other suitable person or organization.

Moreover, in one embodiment, a notification as disclosed herein may also be generated in response to a change in the temperature of the environment in which a telecommunications device such as a cell phone is located that is independent or in addition to user temperature. For example, a notification may be generated and forwarded to a public safety access point if an environment temperature reading exceeds 150 degrees Fahrenheit, where such temperature reading may be indicative of the cell phone being situated in a location that is subject to a fire or explosion. In an alternative embodiment, the notification may be generated and forwarded to a second device of the user, and if the user does not answer or otherwise respond thereto and there is no third device to forward the notification to, the notification may then be forwarded to a public safety access point. The same or an additional temperature sensor such as temperature sensor 122 may be utilized to evaluate such temperature.

In one embodiment, the emergency notification is an audible tone. In another embodiment, the emergency notification is a telephone call to an organization, such as a public safety access point. In another embodiment, the emergency notification is an e-mail to an organization, such as a public safety access point. In yet another embodiment, the emergency notification is an SMS message to an organization, such as a public safety access point, as disclosed in U.S. patent application Ser. No. 12/257,687, entitled "Preformatted Emergency Text Message," which is hereby incorporated by reference. However, it will be appreciated that any notification suitable for alerting a person or an organization that the user may require emergency assistance may be employed.

Additionally, the device 100 may be configured such that the detected temperature must remain within the predetermined range for a specific amount of time (e.g., 3-min.) prior to an emergency notification being generated. The device 100 may be configured such that the rate of change of the detected temperature may be considered in the determination as to whether or not to generate an emergency notification. For example, if the rate of temperature change is relatively high, an emergency notification may not be generated. Moreover, the processor unit 106 and/or memory 116, 118 may be programmed with or otherwise receive location information (e.g. GPS coordinates, elevation, etc.) that is factored into the predetermined temperature range(s). For example, if the user is in a warmer location, e.g., Tucson, Ariz., the upper range may be adjusted by 0.5° F. to 1.0° F. Similarly, if the user is in a cooler location, e.g., Anchorage, Ak., the lower temperature range may be adjusted by −0.5° F. to −1.0° F. Nevertheless, it will be appreciated that the temperature may be adjusted by any suitable amount based on location. Additionally, in one embodiment, the temperature detected by a thermometer or other heat or temperature sensing device is compared to a known ambient temperature of the location of the device to determine the body temperature of the user. Such ambient temperature may be a known ambient internal temperature taken from a thermostat or separately measured temperature reading or a known ambient external temperature taken from a locally known weather temperature reading or otherwise established temperature reading.

Additionally, the processor unit 106 and temperature sensor 122 may be configured to have any suitable sensitivity. For example, the processor unit 106 and temperature sensor 122 may be configured such that a user's body heat is only detected if the device 100 is touching the user's skin, in the user's pocket, or clipped to a user's belt. Alternatively, the processor unit 106 and temperature sensor 122 may be configured such that a user's body heat is detected if the user is within a predetermined radius of the device 100 (e.g., 1-ft., 3-ft., 5-ft., etc.).

The device 100 may also include a device location component 124 which allows the location of the device 100 to be known to the wireless service provider, so that the wireless service provider can use this information (or pass it along) for the purpose of locating the device 100. For example, the device location component 124 may be a global positioning system (GPS) device that is able to identify location coordinates from the one or more GPS satellites. However, it will be appreciated that the device location component 124 may be any suitable device that is capable of providing location information to the wireless service provider. The location information may be transmitted with the initial emergency notification or with a subsequent communication.

Unless described otherwise herein, aspects of the invention may be practiced with conventional systems. Thus, the construction and operation of the various blocks shown in FIG. 1 may be of conventional design, and need not be described in further detail herein to make and use the invention, because such blocks will be understood by those skilled in the relevant art. One skilled in the relevant art can readily make any modifications necessary to the blocks in FIG. 1 based on the detailed description provided herein.

Figure 2:
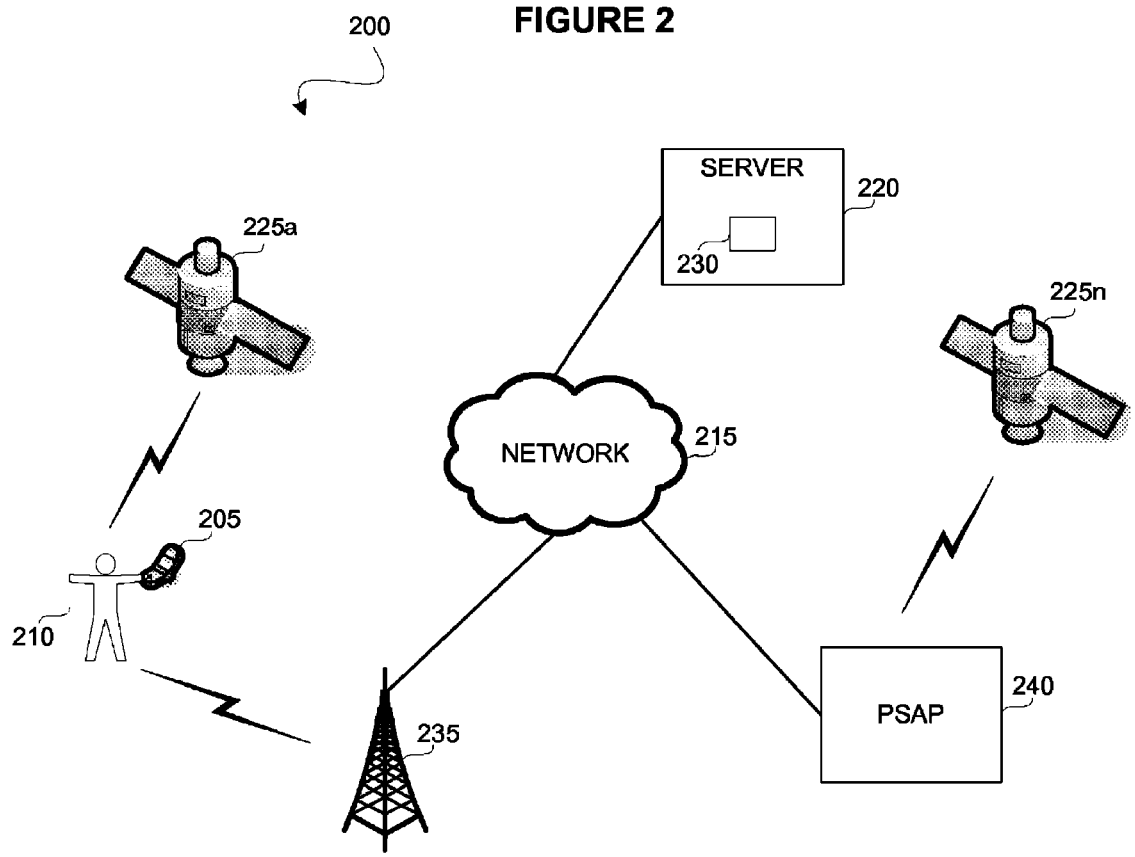
FIG. 2 is an illustration of a telecommunications network employing a telecommunications device capable of monitoring the body temperature of a user.

Referring now to FIG. 2, a system 200 employing a telecommunications device 205 configured to monitor a user's 210 body temperature and generate an emergency notification if or when the user's 210 body temperature enters one or more predetermined ranges is shown. The emergency notification may be any notification suitable for alerting a person or organization that the user 210 requires emergency assistance. Illustrative emergency notification types include, but are not limited to, a telephone call, e-mail, SMS message, audible tone, or other suitable notification. The predetermined temperature range(s) may be the same or substantially similar to the aforementioned ranges; however, it will be appreciated that any temperature range may be employed.

The system 200 may also include, a communications network 215, a network server 220, one or more GPS satellites 225a-225n (collectively 225), and one or more public safety access points (PSAP) 240. The different elements and components of the system 200 may communicate with one another using wireless communications or hardwired connections, such as fiber optics, cable, DSL, telephone lines, and other similar connections. In the illustrative embodiment, the telecommunications device 205 is a wireless telephone and may communicate with the network(s) 215 via one or more mobile communications towers 235. While the illustrative embodiment shows the telecommunications device 205 as being wireless, it will be appreciated that the system 200 may be employed with any type of telecommunications device and is not limited to employing at least one wireless telecommunications device.

The communications network 215 may include any number of networks capable of providing communications between the telecommunications device 205, server 220, GPS satellite(s) 225, and public safety access point(s) (PSAP) 240. For example, the communications network may be one or more, or any combination of, wireless networks, data or packet networks, publicly switched telephone networks (PSTN), or any other suitable networks.

The telecommunications device 205 may be configured to determine or be utilized in determining location information. For example, the telecommunications device 205 may be configured with a global positioning system (GPS) device that is able to identify location coordinates from the one or more GPS satellites 225. The coordinates may then be communicated, via the network 215, to the server 220. Alternatively, the device may utilize triangulation techniques for determining the location of the devices which may then be communicated to the server 220. Thus, it should be understood that GPS coordinates may be but one location coordinate system and that alternative location coordinates may be utilized to determine the location of the device. The telecommunications device 205 may communicate location information to the server 220, periodically, prior to an emergency notification, with an emergency notification or after an emergency notification.

The network server 220 may be any server or device configured to process commands from the device 205 and to facilitate communications between the device 205, the satellites 225, and PSAP 240. The server 220 may include one or more software modules 230, whereby, upon receiving an emergency notification from the device 205 (because the user's 210 body temperature has entered a predetermined range), the notification is routed to an appropriate PSAP 240. In an alternative embodiment, the device 205 may periodically transmit temperature information to the server 220 whereby one or more software modules 230 analyze the temperature information to determine if the received temperature information is within one or more predetermined ranges, and, if so, transmit an emergency notification to an appropriate PSAP 240. In either case, and as previously mentioned, the emergency notification may also include location coordinates of the device 205. Alternatively, the server 220 may query the device 205 for location coordinates, or otherwise determine the location coordinates of the device 205, upon receiving or transmitting an emergency notification. In one embodiment, the server 220 may use the location coordinates of the device 205 to determine the appropriate PSAP 240 to which the emergency notification is routed. Once the emergency notification has been received by the PSAP 240, an operator at the PSAP 240 may then dispatch appropriate personnel to the location of the user 210. While the illustrative embodiment utilizes one or more PSAPs 240, it will be appreciated that any person or organization for handling emergencies in an area in which the device is located may be employed (e.g., police department, EMS station, fires department, etc.).

Figure 3:
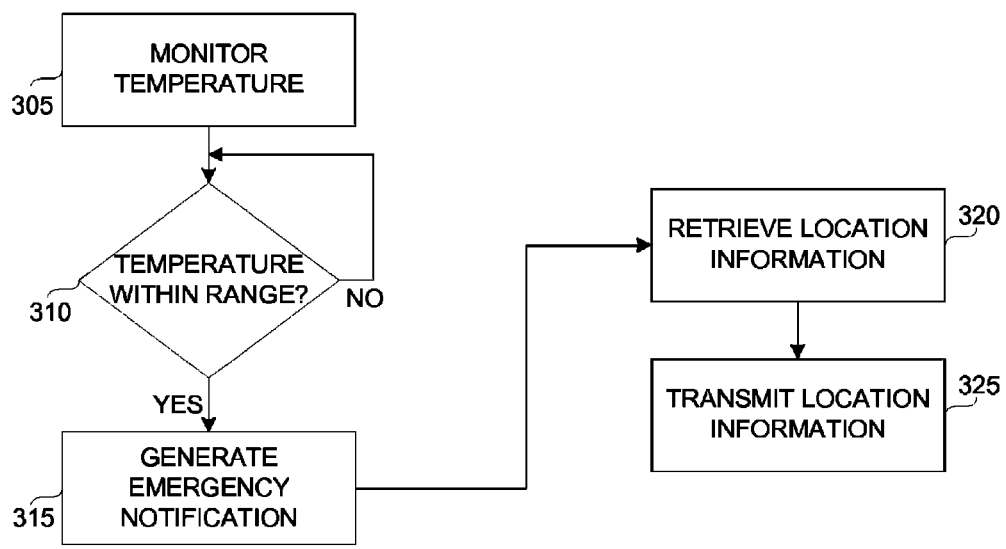
FIG. 3 is a flow diagram of an illustrative process for monitoring the body temperature of a user.

FIG. 3 is a flow chart of an illustrative process 300 for monitoring the body temperature of a user. The process 300 may be implemented by a server, home location register (HLR), class 5 switch, wireless device, VoIP telephone, standard telephone, other advanced intelligence network device, or any combination thereof, generally referred to herein as the "device."

The process begins by monitoring a user's body temperature (step 305). The user's body temperature may be monitored continuously, monitored or detected at regular intervals, randomly, or the like. Next, a determination may be made as to whether the user's body temperature is within one or more predetermined ranges (step 310). The predetermined temperature range(s) may be the same or substantially similar to the aforementioned ranges; however, it will be appreciated that any temperature range may be employed. Also, in determining whether or not a user's body temperature is within a predetermined range, the device may consider not only the detected body temperature in an absolute sense, but the device may also factor in the geographic location of the user, how long the user's body temperature has been within the predetermined range, the rate at which the user's body temperature entered into the predetermined range, or other suitable factors. However, it will be appreciated that the device may merely compare the detected body temperature with the temperatures that define the one or more predetermined ranges. If the user's body temperature is not within a predetermined range, the device may continue to monitor the user's body temperature.

If the user's body temperature is within a predetermined range, the device may generate an emergency notification (step 315). As previously mentioned, the emergency notification may be any notification suitable for alerting a person or an organization that the user may require emergency assistance. The emergency notification may be a signal for receipt by an emergency response organization, such as a PSAP, or any other suitable response organization.

Once the emergency notification has been generated (step 315), the device may retrieve location information to assist responders in locating the user (step 320). The location information may be GPS coordinates or any other suitable coordinate or location information. Once the device has retrieved the location information (step 320), the location information may be transmitted to the emergency response organization (step 325). In an alternative embodiment, the location coordinates are transmitted when the emergency notification is initially generated.

Although the principles of the present invention have been described in terms of the foregoing embodiments, this description has been provided by way of explanation only, and is not intended to be construed as a limitation of the invention. Those skilled in the art will recognize modifications of the present invention that might accommodate recording one-way speech signal samples.

I claim:

1. A method for monitoring the body temperature of a user of a wireless telephone, comprising:
   detecting a body temperature of a user with a sensor disposed in the wireless telephone;
   detecting a rate of change of the detected body temperature;
   determining a geographical location of the user with a GPS device;
   adjusting a predetermined temperature range based upon the determined geographical location of the user;
   determining that the detected body temperature is within the adjusted predetermined temperature range;
   determining that the detected rate of change of the detected body temperature is less than a selected rate of change;
   in response to determining that the detected temperature is within the adjusted predetermined range and in response to determining that the detected rate of change of the detected body temperature is less than the selected rate of change, generating a first emergency notification;
   communicating the first emergency notification to another device of the user;
   awaiting a response from the other device of the user;
   generating a second emergency notification when no response is received from the other device of the user; and
   communicating the second emergency notification to an emergency response organization.

2. The method of claim 1 wherein the first emergency notification is a SMS message.

3. The method of claim 1 wherein the first emergency notification is a telephone call.

4. The method of claim 1 wherein the emergency response organization is a public safety answering point.

5. The method of claim 1 wherein the second emergency notification includes location coordinates, and wherein the location coordinates are GPS coordinates.

6. The method of claim 1 wherein the predetermined temperature range is 103° F.-110° F.

7. A wireless telephone, comprising:
   a temperature sensor configured to monitor the body temperature of a user,
   wherein the temperature sensor is operable to monitor the body temperature of a user from a distance;
   a GPS device configured to determine the geographical location of the user;
   a memory configured to store a set of instructions; and
   a processor in communication with the temperature sensor, the GPS device and the memory, and configured to execute the set of instructions, wherein the set of instructions cause the processor to:
   determine a geographical location of the user with the GPS device;
   adjust a predetermined temperature range based upon the determined geographical location of the user;
   determine that the body temperature of the user is within the adjusted predetermined temperature range in response to receiving a signal from the temperature sensor the signal being associated with monitoring the body temperature of the user;

determine that a rate of change of the detected body temperature is less than a selected rate of change; and in response to determining that the body temperature of the user is within the adjusted predetermined range and in response to determining that the detected rate of change of the detected body temperature is less than the selected rate of change, generating a first emergency notification, communicating the first emergency notification to another device of the user, awaiting a response from the other device of the user, generating a second emergency notification when no response is received from the other device of the user; and communicating the second emergency notification to an emergency response organization, wherein the second emergency notification is a communication over a wireless network for receipt by the emergency response organization.

8. The wireless telephone of claim 7 wherein the first emergency notification is a telephone call.

9. The wireless telephone of claim 7 wherein the emergency response organization is a public safety answering point.

10. The wireless telephone of claim 7 wherein the second emergency notification includes location coordinates.

11. The wireless telephone of claim 7 wherein the temperature sensor is an IR thermometer.

\* \* \* \* \*